US007246067B2

(12) United States Patent
Austin et al.

(10) Patent No.: US 7,246,067 B2
(45) Date of Patent: Jul. 17, 2007

(54) SECURE ONLINE DATING SUPPORT SYSTEM AND METHOD

(75) Inventors: Warren Austin, Scottsdale, AZ (US); Otto Coppen, Aliso Viejo, CA (US)

(73) Assignee: Better Dating Bureau, Inc., Scottsdale, AZ (US)

( * ) Notice: Subject to any disclaimer, the term of this patent is extended or adjusted under 35 U.S.C. 154(b) by 295 days.

(21) Appl. No.: 10/395,324

(22) Filed: Mar. 20, 2003

(65) Prior Publication Data

US 2004/0128152 A1 Jul. 1, 2004

Related U.S. Application Data

(63) Continuation-in-part of application No. 10/330,573, filed on Dec. 26, 2002.

(51) Int. Cl.
*G06Q 99/00* (2006.01)
(52) U.S. Cl. .............................. 705/1; 705/1
(58) Field of Classification Search ................ 705/1, 705/75–77; 726/5
See application file for complete search history.

(56) References Cited

U.S. PATENT DOCUMENTS 6,665,389 B1 * 12/2003 Haste, III ................. 379/196

2001/0026609 A1 * 10/2001 Weinstein et al. ........ 379/93.01
2001/0047347 A1 * 11/2001 Perell et al. ................... 707/1
2002/0116458 A1 * 8/2002 Bricklin et al. ............ 709/204

OTHER PUBLICATIONS

"Driving license ID's help nightclubs create valuable database"; Foster, Carly and Isabel Teotino; Toronto Star; Nov. 21, 2001.*

* cited by examiner

*Primary Examiner*—John G Weiss
*Assistant Examiner*—Traci L. Casler
(74) *Attorney, Agent, or Firm*—Knobbe, Martens, Olson & Bear LLP (57) ABSTRACT

A secure online dating support system and method requires potential members to submit personal information regarding themselves as a predicate to becoming a member of the dating system. This personal information is provided in a manner, either in-person at an information receiving center, or submitted to an information collector, or submitted directly to an online dating service, that permits its verification. Preferably, authorization is also provided by the potential member for further investigation, resulting in an investigator conducting an investigation, and communicating the results to the online dating service, so that the information revealed by the investigation can be displayed to members of the online dating service and/or to individuals outside of the dating service who have been given access by the participating member.

22 Claims, 7 Drawing Sheets

Member Report

BRONZE MEMBER #: AHU765TG8

John Smith

| | |
|---|---|
| bDb Photos Taken: | 10-22-2002 |
| Drivers License Scanned: | 10-22-2002 |
| Date of Birth: | 02-14-1966 |
| Height: | 6 feet, 1 inch (10-22-2002) |
| Weight: | 180 pounds (10-22-2002) |
| Marital Status: | Divorced (10-22-2002) |
| E-Mail Address: | johnrsmith@aol.com |
| bDb Member Complaints ? | None filed |

Member Report

BRONZE MEMBER #: AHU765TG8

John Smith

| | |
|---|---|
| bDb Photos Taken: | 10-22-2002 |
| Drivers License Scanned: | 10-22-2002 |
| Date of Birth: | 02-14-1966 |
| Height: | 6 feet, 1 inch (10-22-2002) |
| Weight: | 180 pounds (10-22-2002) |
| Marital Status: | Divorced (10-22-2002) |
| E-Mail Address: | johnrsmith@aol.com |
| bDb Member Complaints ? | None filed |

FIG. 5

Member Report

SILVER MEMBER #: AX93797C

John Smith

| | |
|---|---|
| bDb Photos Taken: | 10-22-2002 |
| Drivers License Scanned: | 10-22-2002 |
| Date of Birth: | 02-14-1966 |
| Height: | 6 feet, 1 inch (10-22-2002) |
| Weight: | 180 pounds (10-22-2002) |
| Marital Status: | Divorced (10-22-2002) |
| SSN Verification: | IN PROCESS |
| Education: | BS Business Administration University of Washington |
| Citizenship: | United States |
| Employment Status | Full Time (10-22-2002) |
| Employment (Industry Last 5 yrs): | Medical Sales |
| Credit Rating | NOT PROVIDED |
| Rent/Own Residence: | Own – Phoenix, AZ |
| Income Average Last 3 Years: | $50,000 – $75,000 (American) |
| E-Mail Address: | johnrsmith@aol.com |
| bDb Member Complaints ? | None filed |

FIG. 6

Member Report

GOLD MEMBER #: AH6J8752C
John Smith

| | |
|---|---|
| bDb Photos Taken: | 10-22-2002 |
| Drivers License Scanned: | 10-22-2002 |
| Date of Birth: | 02-14-1966 |
| Height: | 6 feet, 1 inch (10-22-2002) |
| Weight: | 180 pounds (10-22-2002) |
| Marital Status: | Divorced (10-22-2002) |
| SSN Verification: | IN PROCESS |
| Aliases: | None found |
| Education: | BS Business Administration University of Washington 1974 |
| Citizenship: | United States |
| Employment Status | Full Time (10-22-2002) |
| Employment (Industry Last 5 years): | Medical Sales |
| Credit Rating | 797 Points |
| Rent/Own Residence: | Own |
| Income Average Last 3 Years: | $50,000 – $75,000 (American) |
| Professional Licenses: | None claimed |
| Statewide Driving Record (7 years): | No violations found |
| Statewide Criminal Record: | No violations found |
| Federal Criminal Search | No violations found |
| Drug Test: | Performed 10-22-2002 NEGATIVE |
| AIDS Test: | Performed 10-22-2002 NEGATIVE |
| Alcohol Abuse Test | Performed 10-22-2002 NEGATIVE |
| E-Mail Address: | johnrsmith@aol.com |
| bDb Member Complaints ? | None filed |

SECURE ONLINE DATING SUPPORT SYSTEM AND METHOD

CROSS-REFERENCE TO RELATED APPLICATIONS

This is a continuation-in-part of U.S. patent application Ser. No. 10/330,573 filed Dec. 26, 2002 in the name of the Applicants, to which priority is claimed.

FIELD OF THE INVENTION

This invention relates generally to online dating support systems and methods and, more particularly, to a secure online dating support system and method in which relevant personal information about participants is obtained, verified and provided to other participants.

BACKGROUND OF THE INVENTION

The online (or Internet) dating service industry has grown significantly in recent years. ComScore Media Medtrix has provided recent user information for a number of the larger personals/dating web-sites (there are over 200 on-line dating sites), as follows:

| Web-site | Number of Unique Users (as of July 2002) |
| --- | --- |
| Match.com | 5,665,000 |
| Yahoo! Personals | 4,412,000 |
| Date.com | 2,295,000 |
| Matchmaker.com | 1,522,000 |
| Someonelikesyou.com | 1,237,000 |
| Dreammates.com | 983,000 |

In addition, a recent Jupiter Research study stated that more than 34 million people have visited online personal ad sites, and that the average user spends 13 hours a month on such sites.

Despite its growth, the online dating/personals industry continues to be plagued by the problem of users either misrepresenting themselves (e.g., as younger, more attractive (via outdated pictures or through misrepresentation of height/weight), more successful, etc.), or concealing important information (e.g., a criminal record, a drug or alcohol addiction, sexually transmitted diseases, a marriage, etc.). As of Dec. 11, 2002, there have been over 17,900 online dating horror stories, and some have ended tragically.

Accordingly, a need exists for a support system and method for online dating that provides participants with the security of knowing that participants are representing themselves accurately, and further that potentially harmful information is fully disclosed. The system and method needs to provide a convenient vehicle for persons to submit information and to provide the online dating support service with the needed permission and information to conduct a further background examination. The present invention satisfies these needs and provides other, related advantages.

SUMMARY OF THE INVENTION

It is an object of the present invention to provide an online dating support system and method that provides for the voluntary verification of relevant personal information concerning participants.

It is a further object of the present invention to provide an online dating support system and method that provides for the conduct of a voluntary background check of participants.

It is a still further object of the present invention to provide an online dating support system and method in which verified personal and background information concerning one participant may be disclosed to other participants.

It is a yet further object of the present invention to provide more than one level of participant verification, with the extent of verification and/or the frequency of re-verification varying from level to level.

It is a yet further object of the present invention to provide a method of personal information verification for dating that provides for the verification of relevant personal information concerning participants.

Other objects, features and advantages of the present invention will become apparent from a consideration of the following detailed description.

BRIEF DESCRIPTION OF THE PREFERRED EMBODIMENTS

In accordance with one embodiment of the present invention, an online dating support system is disclosed. The system comprises, in combination: an online dating service; at least one potential member in communication with the online dating service; at least one member in communication with the online dating service; a personal information and authorization receiving center in communication with the online dating service; and an investigator in communication with the online dating service.

In accordance with another embodiment of the present invention, a method of online dating is disclosed. The method comprises the steps of: providing an online dating service; providing at least one potential member of the online dating service; providing at least one member of the online dating service; providing a personal information and authorization receiving center in communication with the online dating service; providing an investigator in communication with the online dating service; the at least one potential member visiting the personal information and authorization receiving center; the at least one potential member providing personal information to the information and authorization receiving center; the information and authorization receiving center communicating the personal information to the online dating service; the online dating service accepting the potential member as a member; and the online dating service posting at least some of the personal information concerning the potential member on a web-site.

In accordance with still another embodiment of the present invention a method of online dating is disclosed. The method comprises the steps of: providing an online dating service; providing at least one potential member of the online dating service; providing at least one member of the online dating service; providing a personal information and authorization receiving center in communication with the online dating service; providing an investigator in communication with the online dating service; the at least one potential member visiting the personal information and authorization receiving center; the at least one potential member providing personal information to the information and authorization receiving center, the personal information includes at least one of the following: a photograph of the potential member, wherein the photograph is taken at the information and authorization receiving center, height and weight information concerning the potential member, wherein the height and weight information is obtained at the information and authorization receiving center, birth certificate, information concerning marital status, income information, sexually transmitted disease information, and property ownership information; the potential member providing to the information and receiving center written authorization to obtain additional information concerning the potential member; providing an investigator in communication with the online dating service; the investigator investigating the potential member; providing at least two levels of membership for the online dating service, wherein the at least two levels of membership are differentiated based on an amount of the personal information provided; the information and authorization receiving center communicating the personal information to the online dating service; the online dating service accepting the potential member as a member; and the online dating service posting at least some of the personal information concerning the potential member on a web-site, wherein an accessing member's access to the personal information concerning other of the members is restricted based on the accessing member's membership level.

In accordance with still another embodiment of the present invention a method of personal information verification for dating is disclosed. The method comprises the steps of: providing a personal information and authorization receiving center; a person providing personal information to the information and authorization receiving center, wherein the personal information further includes at least one of the following: a photograph of the person, wherein the photograph is taken at the information and authorization receiving center, height and weight information concerning the person, wherein the height and weight information is obtained at the information and authorization receiving center, birth certificate, information concerning marital status, income information, sexually transmitted disease information, and property ownership information; the personal information and authorization receiving center verifying the personal information; and the personal information and authorization receiving center providing the person with a certification of the personal information.

In accordance with still another embodiment of the present invention a method of personal information verification for dating is disclosed. The method comprises the steps of: providing an online dating service, providing at least one potential member of the online dating service, providing at least one member of the online dating service, providing an information collector in communication with the online dating service, the information collector visiting the at least one potential member, the at least one potential member providing personal information to the information collector, the information collector communicating the personal information to the online dating service, the online dating service accepting the potential member as a member, and the online dating service posting at least some of the personal information concerning the potential member on a web-site.

In accordance with still another embodiment of the present invention a method of personal information verification for dating is disclosed. The method comprises the steps of: providing an online dating service, providing at least one potential member of the online dating service, providing at least one member of the online dating service, taking a photograph of the at least one potential member, the photograph having a date tag, providing the photograph to the online dating service, the online dating service accepting the potential member as a member, and the online dating service posting the photograph on a web-site.

In accordance with still another embodiment of the present invention a method of personal information verification for dating is disclosed. The method comprises the steps of: providing an online dating service, providing at least one potential member of the online dating service, providing at least one member of the online dating service, the at least one potential member obtaining a credit report, the at least one potential member sending the credit report to the online dating service, the online dating service accepting the potential member as a member, and the online dating service posting at least some information from the credit report concerning the potential member on a web-site.

In accordance with still another embodiment of the present invention a method of personal information verification for dating is disclosed. The method comprises the steps of: providing an online dating service, providing at least one potential member of the online dating service, providing at least one member of the online dating service, a person providing personal information to the online dating service, wherein the personal information further includes at least one of the following: at least one photograph of the person, height and weight information concerning the person, birth certificate, information concerning marital status, income information, sexually transmitted disease information, and property ownership information, the online dating service verifying the personal information, the online dating service accepting the potential member as a member, and the online dating service posting at least some of the personal information concerning the potential member on a web-site.

DETAILED DESCRIPTION OF THE PREFERRED EMBODIMENTS

Figure 2:
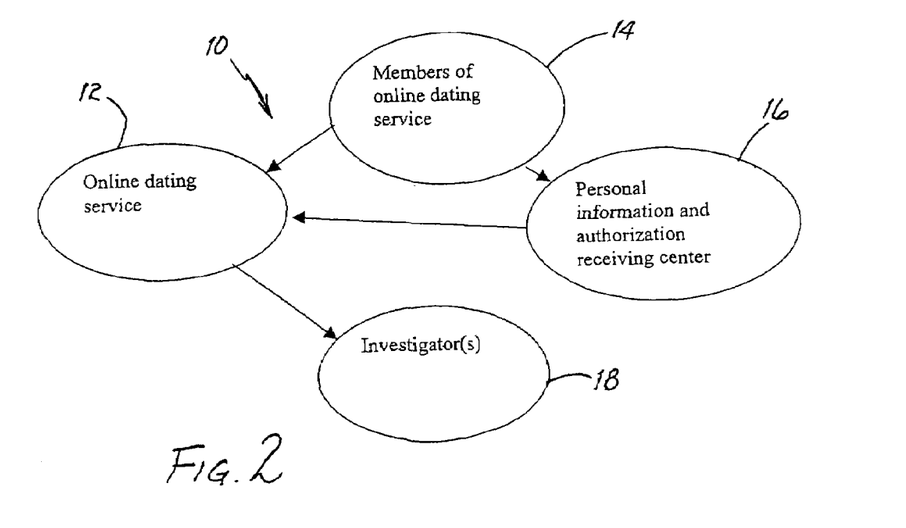
FIG. 2 is a block diagram of the basic components of an embodiment of an online dating support system consistent with the present invention, reflecting the interaction therebetween.

Referring first to FIG. 2, the basic components of an online dating support system 10 consistent with the present invention is shown. The online dating service 12 includes an Internet-based web-site, where members 14 of the service 12 can access information about other members 14 and about the service 12. Optionally, authorized non-members of the service are permitted to access information about other members 14. One way in which this could be accomplished could be through the use of access codes. A member 14 could give a non-member (or a member) an access code that allows the non-member (or member) to access a pre-determined amount of personal information about the member 14. Optionally, each member 14 could be given more than one access code, with each access code allowing a non-member (or member) to access a different amount of personal information about the member 14. The non-member (or member) could access an amount of personal information about the member 14 through a website of the online dating service, by receiving an email from the online dating service, or by some other means. Also optionally, from that web-site, through a hyperlink or the like, members 14 can communicate with other members 14.

The service 12 will also comprise an operations component, which is concerned with the intake of new members, the obtaining of personal information concerning potential and existing members, the obtaining of authorization from potential and existing members for background checks, and, generally, the overall operation of the system 10. The service 12 will interface, electronically and/or otherwise, with each of the other system 10 components. These include, specifically, potential members and members 14 of the service 12, a personal information and authorization receiving center(s) 16, and an investigator(s) 18.

Figure 1:
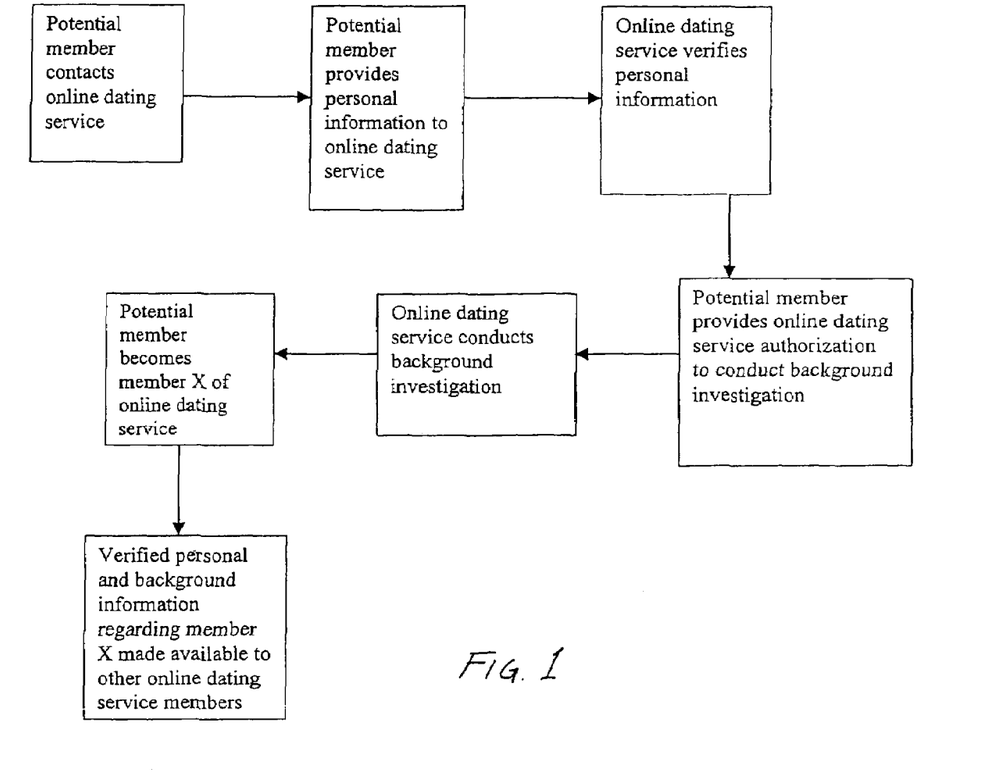
FIG. 1 is a flow chart illustrating an embodiment of an online dating method and support system consistent with the present invention.
Figure 4:
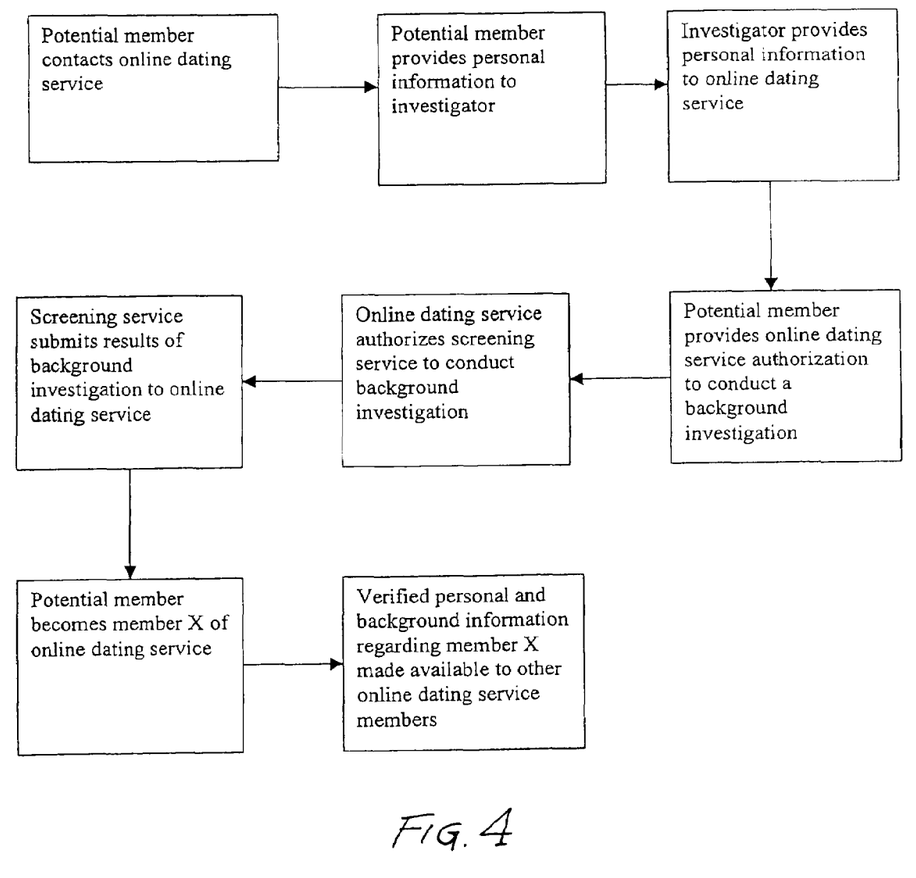
FIG. 4 is a flow chart illustrating another embodiment of an online dating method and support system consistent with the present invention and involving an information collector and a screening service.

Referring now to FIG. 1, the operation of the method of the present invention and the functions performed by the various system components will be illustrated by a description of its operation. Initially, a potential member contacts the service 12. Preferably, that contact is made by accessing the service 12's web-site, though contact may be made in other forms as well. It should further be noted that contact may be made, initially, by a potential member contacting another dating service web-site, which web-site could provide a hyperlink to the service 12's web-site. Still further, initial contact may be made at a physical location, such as copy center, a health club or the like. Yet further, initial contact may be made by an information collector who visits a potential member at an agreed upon location (this embodiment is illustrated in FIG. 4).

The potential member will then provide the service 12 with some initial personal information. This should include, at a minimum, the potential member's name. It may, optionally, include additional information, such as an address, date of birth, telephone number, photograph, etc. Following receipt of the initial personal information, the service 12 preferably will provide the potential member with an alphanumeric code.

At least at this point, the verification process begins. In one embodiment, the potential member will travel to a personal information and authorization receiving center 16. This may be an office or the like operated by the service 12, or a copy center or the like that has arranged with the service 12 to perform information and authorization receiving services. In one embodiment, the center 16 is a copy center, due to the large number of such establishments and their possession of photographic, scanning, copying and computer equipment of a type that greatly facilitates the information and authorization receiving process, and the communication of that information to the service 12. It should be clearly understood, however, that substantial benefit could be derived from an alternative configuration of the method and support system for online dating in which the personal information and authorization receiving center 16 is at a location other than a copy center, such as a health club.

The potential member will provide the center 16 with the alphanumeric code that the potential member received from the service 12. The center 16 will then obtain personal information from the potential member. Such information can include any of the following: a fingerprint, a driver's license, the potential member's height and weight, digital (or non-digital) photographs (preferably a head shot and a full body shot), digital (or non-digital) video clip, a year-to-date pay stub, a birth certificate (or other proof of citizenship/lawful residence, such as a visa or green card), college diploma(s), reference letters, mortgage statement, income tax form 1040's for prior year, credit report, resume and/or other employment information, divorce decree, professional association information, and an e-mail address. In the event that multiple membership levels are provided, the extent of personal information obtained may be a function of the level of membership selected by the potential member, with the higher membership levels requiring greater disclosure of personal information.

The documentary information is preferably scanned by the center 16, so that it may be provided electronically to the service 12. The potential member's height and weight should be obtained using standard measuring equipment, and recorded by the center 16 for transmission to the service 12. The fingerprint should be obtained in the ordinary manner and scanned, again for electronic transmission to the service 12. Once received by the service 12 or a screening service, the personal information of the potential member is verified.

Figure 8:
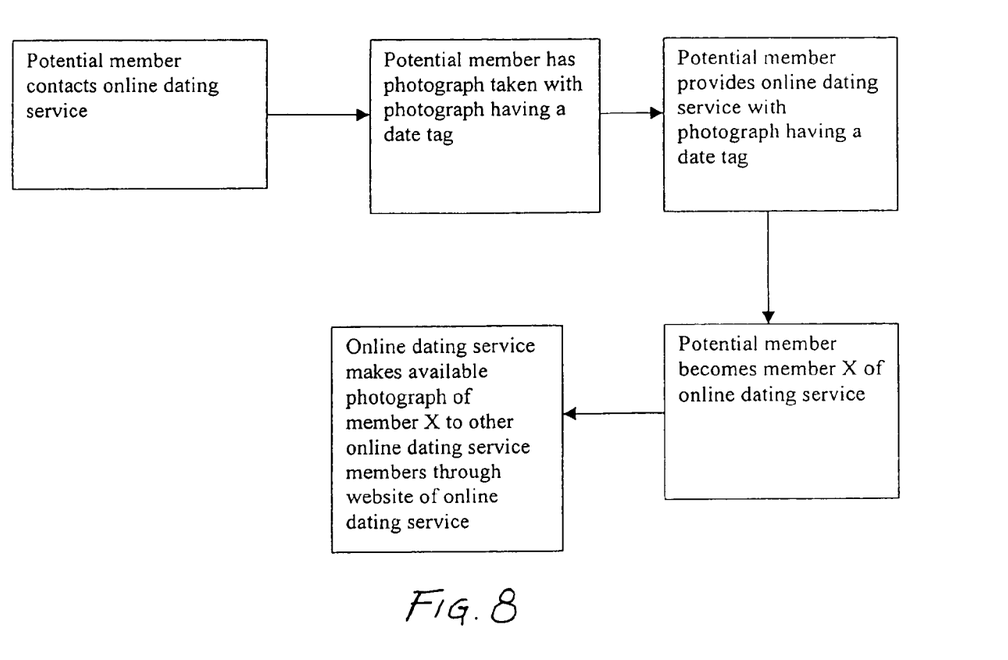
FIG. 8 is a flow chart illustrating another embodiment of an online dating method and support system consistent with the present invention whereby a potential member provides an online dating service with a photograph having a date tag.
Figure 9:
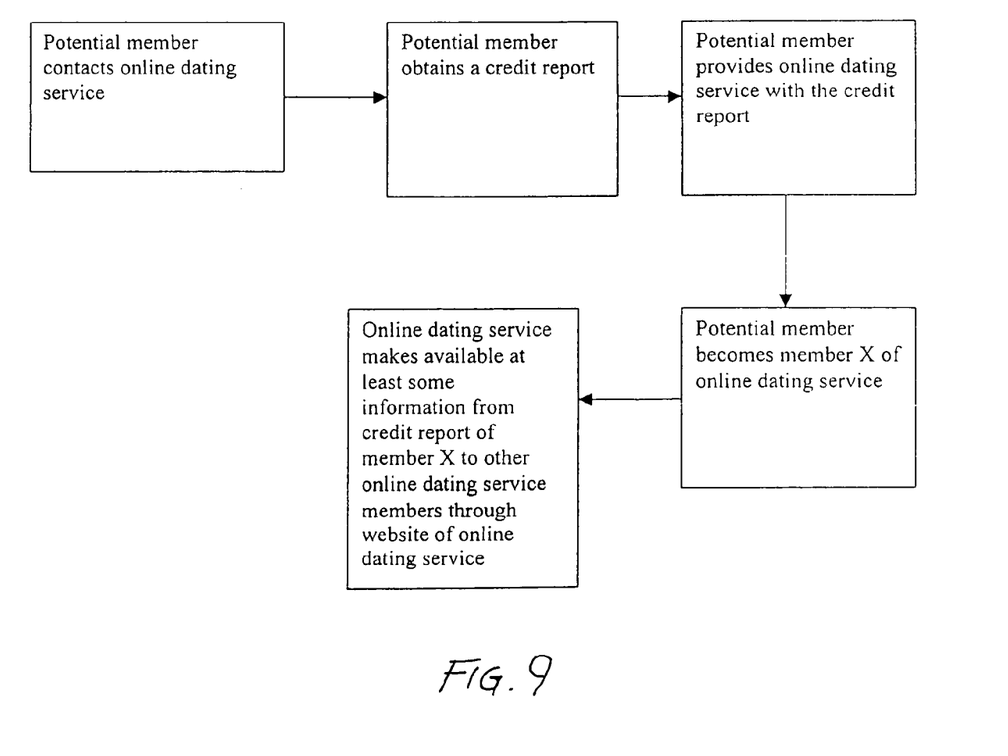
FIG. 9 is a flow chart illustrating another embodiment of an online dating method and support system consistent with the present invention whereby a potential member provides an online dating service with a credit report.
Figure 10:
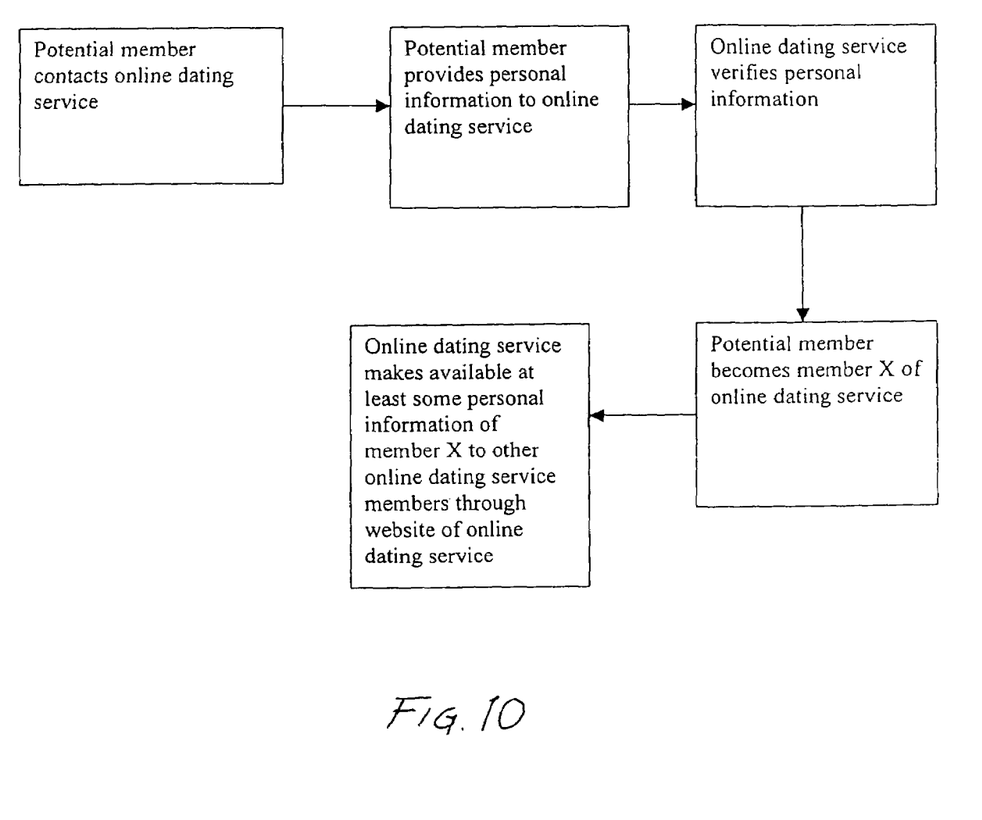
FIG. 10 is a flow chart illustrating another embodiment of an online dating method and support system consistent with the present invention whereby a potential member provides an online dating with personal information that is first verified by the online dating service before being posted on a website.

Referring now to FIGS. 8-10, alternative embodiments of the present invention are shown. The methods of online dating shown in these figures are essentially the same as before, except that the potential member transmits the documentary information or other personal information (by fax, electronically, regular mail, or by some other means) directly to the service 12 (as shown in FIG. 10) or to a screening service. In the embodiments shown in FIGS. 8-10, the method of online dating may comprise only a potential member and the online dating service, with no authorization and receiving center or other individual or entity involved. Referring to FIG. 9, the potential member obtains his or her own credit report and subsequently provides it to the service 12. Referring to FIG. 8, the potential member has a photograph taken having a date tag of some kind. The date tag could be imprinted on the photograph or the date tag could be some other tag capable of verifying the date of the photograph (such as the subject of the photograph holding a newspaper or magazine with the date clearly visible). The potential member then provides the photograph to the service 12 or, alternatively, to a screening service.

In addition to the obtaining of personal information from the potential member, the center 16 will also accept signed authorizations from the potential member for further investigation. Again, the number and type of authorizations obtained may be a function of membership level, if multiple levels are provided. Authorizations could include forms permitting access to Department of Motor Vehicle records, medical records, criminal records, to conduct screening of blood and urine samples, and the like. Additionally, the center 16 could obtain from the member 16 urine and blood samples, for purposes of conducting tests for the presence of drugs, alcohol, or sexually transmitted diseases. (Alternatively, a potential member could be referred to a medical practitioner or the like for purposes of providing such samples.)

Information and authorization obtained from the potential member should be communicated to the service 12. To the extent needed for purposes of conducting further investigation of the potential member, the service 12 will communicate information/authorization to an investigator(s) 18 or a screening service (as shown in the flow chart in FIG. 5). The investigator 18 can inquire into a potential member's marital status, criminal background, employment record, educational background, professional licenses, court records, driving record, credit record, and other information potentially relevant to a potential member's suitability as a dating or marriage partner.

It is preferred that the investigator(s) 18 be one or more vendors that operate independently of the service 12 and pursuant to an agreement therewith, though it is possible that some or all of these investigation services could be performed internally by the service 12 or by a screening service. If the investigator(s) 18 is independent of the service 12, it will communicate the information that it obtains regarding a potential member to the service 12.

Referring now to FIG. 4, an alternative embodiment of the method for online dating is shown. The method of online dating shown in FIG. 4 is essentially the same as before, except that in place of an authorization and receiving center, an information collector visits the potential member. Preferably, the information collector will photograph and measure the potential member (preferably height and weight). The information collector may also gather other basic information, such as the person's name and address. The information collector preferably will also collect signed authorizations from the potential member for further investigation. In addition, the information collector preferably will also collect any documentary information in order to transfer this documentary information to a screening service for verification purposes. Optionally, the information collector may take a blood and/or urine sample. Once the information collector has completed collecting information, the information is then communicated either directly to the service 12 or to a screening service for verification. The screening service would then communicate its findings to the service 12.

When the information gathering process is completed, the service 12 may then communicate to the potential member whether or not he or she has been accepted as a certified member (as opposed to a potential member at the beginning of the process). At one or more of the foregoing steps, payment can be required of the potential member, in the form of an application fee, processing fee, provisional membership fee, monthly membership fees, membership fee, or the like. Preferably, the potential member pays at the beginning of the process, but holds only provisional member status until verification of personal information is achieved. Upon acceptance as a member, it may also be desired to require payment of a periodic subscription fee, such as a monthly fee, for participation in the service 12.

Figure 5:
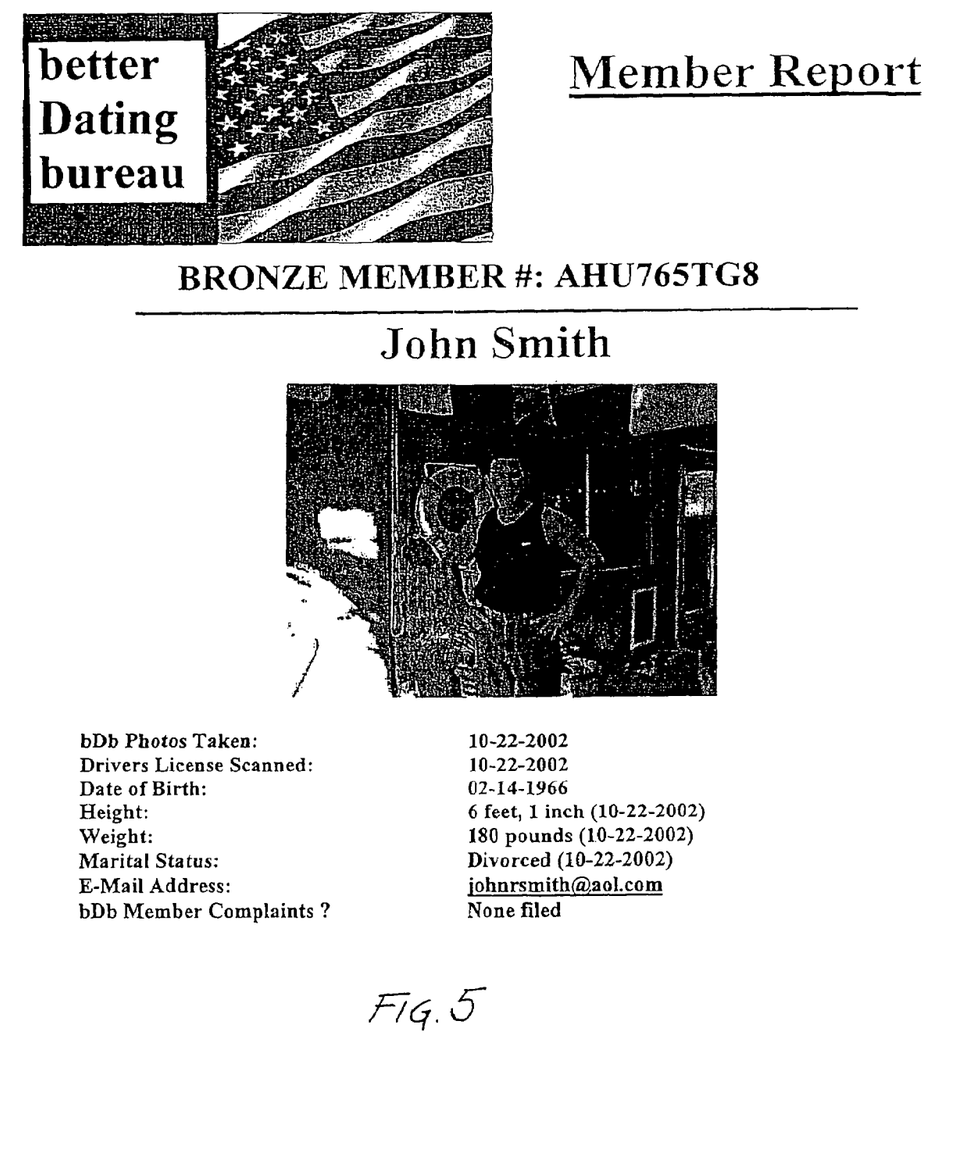
FIG. 5 is an exemplar of a bronze member report.
Figure 6:
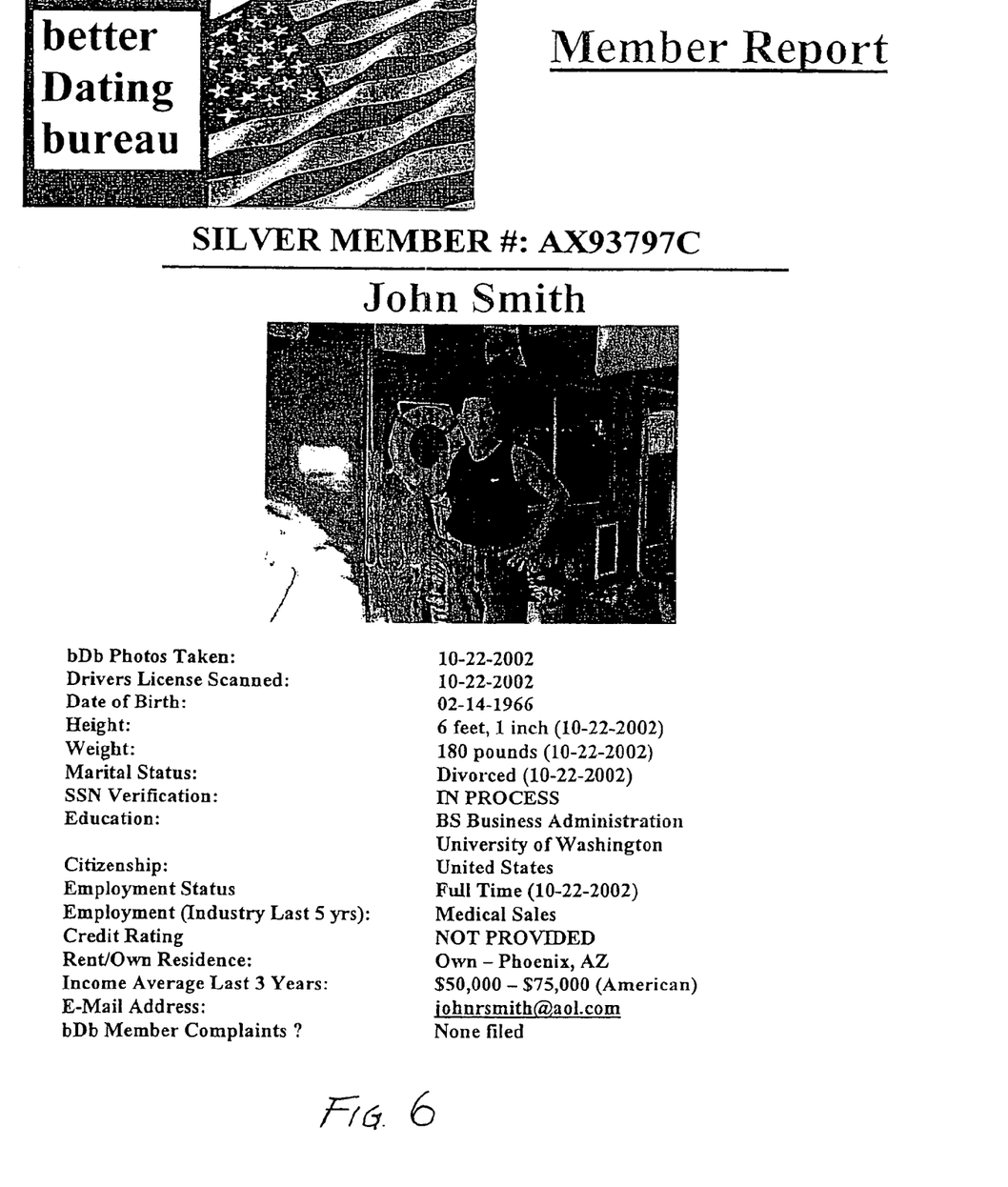
FIG. 6 is an exemplar of a silver member report.
Figure 7:
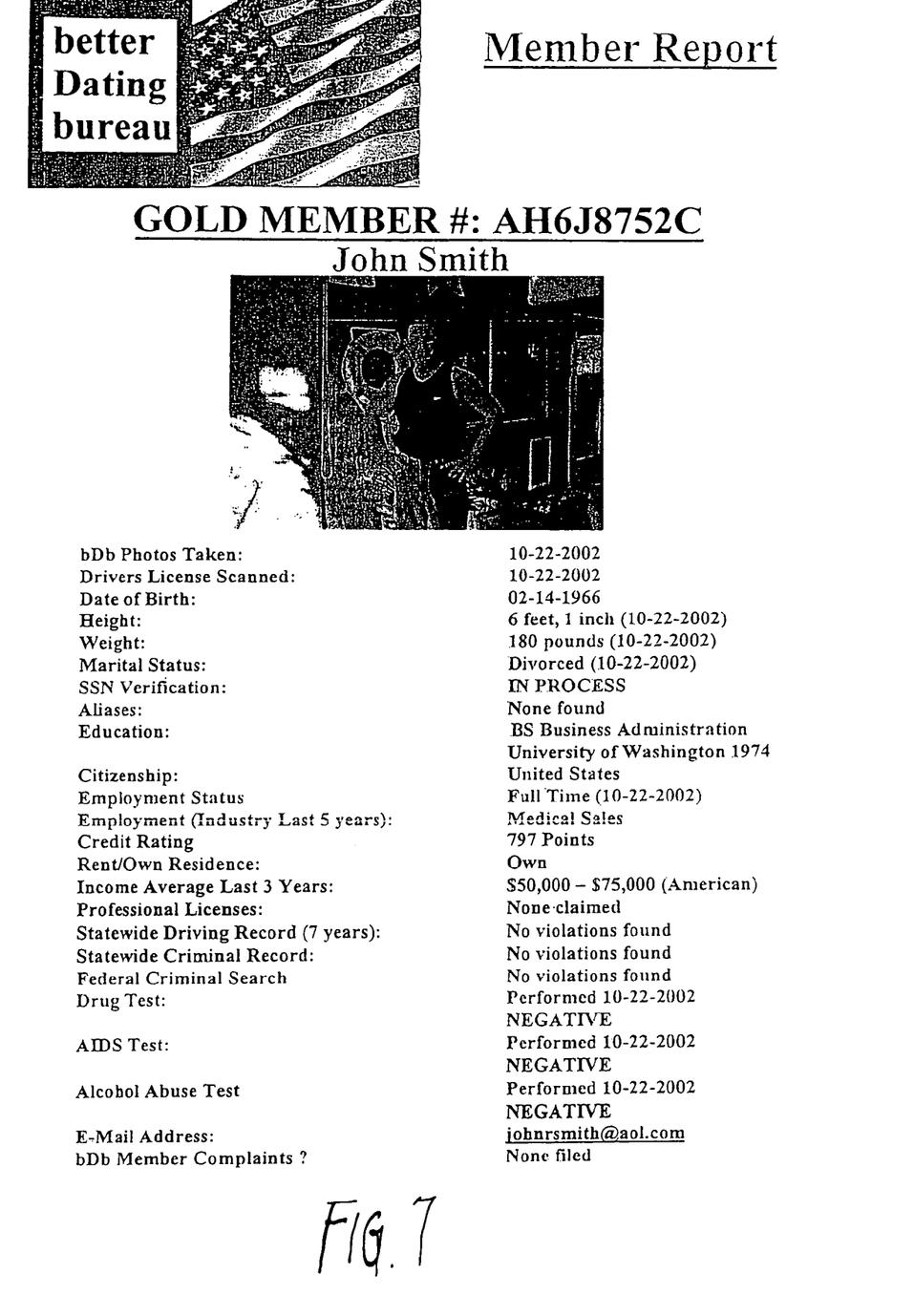
FIG. 7 is an exemplar of a gold member report.

Once a potential member's membership in the service 12 is finalized, the service 12 should take the necessary steps to make the new member's personal and background information available to other members of the service 12. Referring to FIGS. 5-7, this represents one form in which the member information may be displayed, with more information being displayed depending on the level of membership (e.g., bronze, silver and gold).

Preferably, members of the service 12 are required to update their personal and background information on a periodic basis, for example, once a year.

With respect to the possible feature of membership levels, these can be differentiated on one or more bases. Higher (and presumably more expensive) levels can require greater disclose of personal and background information. Alternatively, or in addition, higher levels can require more frequent updating of personal and background information.

By way of example, it may be desired to provide three levels of membership—bronze, silver, and gold—with bronze being the most basic and gold being the highest. A bronze membership may only require confirmation of identity, height and weight, a current photograph(s), and marital status. A silver membership could additionally require home ownership confirmation, provision of a birth certificate, income verification, and a credit report. A gold membership could require the silver and gold information and, in addition, driving and criminal records, substance abuse testing, professional license and association information, etc. (It should be noted that where membership levels are provided, there may be as few as two or more than three.)

Where different levels are provided, it may be desired to limit a member's access to other members at or below his or her level. For example, a gold member could access gold, silver or bronze members, while a silver member could only access silver or bronze members. Alternatively, a one-time fee could be charged for accessing members at higher levels. Alternatively, each member could access at least bronze level personal information from any other member, but additional personal information will only be available to those of an equal or greater level of membership.

The service 12 will preferably perform other functions, in addition to those described above. For example, it can facilitate the filing by e-mail or otherwise complaints by one member against another. It can, relatedly, create records of such complaints, so that they may be reviewed by members. The service 12 can facilitate a member's response to complaints against him or her, and possibly the resolution of complaints.

Additionally, the service 12 may offer psychological and/or personality testing of members/potential members. Such test(s) could be administered at the center 16, or online via the service's web-site or the web-site of an independent test administering entity.

Figure 3:
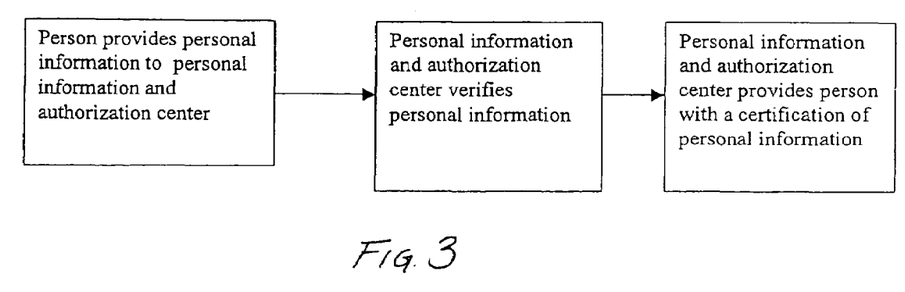
FIG. 3 is a flow chart illustrating an embodiment of dating method and support system consistent with the present invention.

Referring now to FIG. 3, an alternative embodiment of the present invention is shown. In this embodiment, personal information verification for dating is provided for users in an offline forum. Initially, a user would provide personal information to a personal information and authorization receiving center (or potentially to an information collector as discussed in other embodiments above). Once all information is fully screened and verified, the information and authorization center (or the information collector) will provide the user/member with a certification of the personal information. This certification could come in the form of a personal card that could be used in much the same way as a business card, whereby one could present such a personal card to a prospective date in person or when meeting for the first time face-to-face.

While the invention has been particularly shown and described with reference to preferred embodiments thereof, it will be understood by those skilled in the art that the foregoing and other changes in form and details may be made therein without departing from the spirit and scope of the invention.

We claim:

1. A method of verifying information for online dating comprising the steps of:
   providing an online dating service;
   providing at least one potential member of said online dating service;
   providing at least one member of said online dating service;
   providing an information collector in communication with said online dating service;
   said at least one potential member providing at least one photograph displayed on said online dating service and a driver's license with a photograph of said potential member to said information collector;
   said information collector verifying that said at least one photograph of said potential member is the same person in the photograph on the driver's license;
   said information collector communicating a verification to said online dating service that said at least one photograph displayed on said online dating service is verified with a government-issued photo identification; and
   said online dating service posting said verification on a web-site.

2. A method of providing verified potential dating partner information comprising:
   verifying a date that at least one photograph of a person was taken;
   verifying that the at least one photograph is an accurate photograph of the person by comparing the at least one photograph with a government-issued photograph of the person;
   inputting, into a potential dating partner database, information about the at least one person including the at least one photograph of the person and the date that has been verified as the date that the photograph was taken;
   posting said information on a potential dating partner information service accessible over a network which is configured to allow a user to view the information about the person to evaluate the person as a potential dating partner, wherein the step of posting includes posting an indication that the photograph has been verified as an accurate photograph of the person by comparison of the photograph with a government-issued photograph of the person.

3. The method of claim 2, further comprising verifying a height of the person, wherein the step of inputting further comprises inputting the includes height that has been verified as the height of the person.

4. The system method of claim 3, further comprising verifying an age of the person wherein the step of inputting further comprises inputting an indication of age that has been verified as an indication of the age of the person.

5. The method of claim 4, wherein the step of inputting an indication of the age of the person comprises inputting a date of birth.

6. The system method of claim 4, further comprising posting an indication that the verification of at least one of the photograph, the height, or the age is current as of the verification date.

7. The system-method of claim 2, wherein the step of verifying a date of the photograph comprises verification by an entity that took the photograph or referring to a document created by the entity that established the date that the photograph was taken.

8. method of claim 7, wherein the step of referring to a document comprises referring to the photograph and the photograph which includes a date stamp.

9. The method of claim 4, wherein the step of verifying an age comprises referring to a document created by a government agency that establishes the indication of age.

10. The method of claim 9, wherein the step of referring to a document comprises referring to a birth certificate.

11. The method of claim 2, wherein the potential dating partner information service is part of a dating support system website that is separate from an online dating service.

12. The method of claim 4, wherein the said step of posting comprises posting said information on a dating support system website that is separate from an online dating service.

13. The method of claim 2, further comprising selectively granting or restricting access to the persons information.

14. The system method of claim 4, further comprising selectively granting or restricting access to the persons information.

15. A method of providing verified information about a potential dating partner, the method comprising:
    inputting into a potential dating partner database information about a potential dating partner, comprising at least one photograph of the potential dating partner and a government-issued photo identification of the potential dating partner;
    verifying the accuracy of the information, including verifying the identity of the person in the photograph by comparison of the photograph with a government-issued photo identification of the person; and
    posting a certification that the identity of the person in the photograph has been verified with a government-issued identification on a dating support system website that is separate from an online dating service.

16. The method of claim 15, further comprising restricting access to the verified information to one or more persons that the potential dating partner allows to access the information.

17. The method of claim 16, wherein restricting access to the verified information comprises allowing access to a person that enters an access control code associated with the verified information.

18. The method of claim 17, further comprising transmitting the access control code associated with the verified information to the potential dating partner.

19. The method of claim 15, wherein verifying the accuracy of the information comprises having an entity independent of the potential dating partner collect the information.

20. The method of claim 19, wherein verifying the accuracy of the information comprises having an entity independent of the potential dating partner conduct an investigation of the information.

21. The method of claim 15, wherein verifying the accuracy of the information comprises reviewing at least one document, created by an entity independent from the potential dating partner, that supports the accuracy of the information.

22. The method of claim 21, wherein at least one of the documents that is reviewed was created by a government agency.

* * * * *